(12) United States Patent
Sabard et al.

(10) Patent No.: US 9,315,646 B2
(45) Date of Patent: Apr. 19, 2016

(54) THERMOPLASTIC LAYER FOR A CABLE, PIPE, COATING OR ANALOGOUS

(71) Applicant: Arkema France, Colombes (FR)

(72) Inventors: Mathieu Sabard, Serquigny (FR); Dominique Jousset, Bougival (FR); Jean-Jacques Flat, Goupillieres (FR); Bernard Pees, Allauch (FR); Maliha Khusrawy, Bernay (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/401,031

(22) PCT Filed: May 3, 2013

(86) PCT No.: PCT/FR2013/050980
§ 371 (c)(1),
(2) Date: Nov. 13, 2014

(87) PCT Pub. No.: WO2013/171401
PCT Pub. Date: Nov. 21, 2013

(65) Prior Publication Data
US 2015/0105510 A1  Apr. 16, 2015

(30) Foreign Application Priority Data

May 16, 2012  (FR) .................................. 12 54501

(51) Int. Cl.
| | | |
|---|---|---|
| C08K 3/34 | (2006.01) |
| B32B 27/08 | (2006.01) |
| C08G 81/02 | (2006.01) |
| C08L 51/06 | (2006.01) |
| B32B 1/08 | (2006.01) |
| B32B 27/18 | (2006.01) |
| B32B 27/32 | (2006.01) |
| B32B 27/34 | (2006.01) |
| B82Y 30/00 | (2011.01) |

(52) U.S. Cl.
CPC . *C08K 3/346* (2013.01); *B32B 1/08* (2013.01); *B32B 27/08* (2013.01); *B32B 27/18* (2013.01); *B32B 27/32* (2013.01); *B32B 27/34* (2013.01); *C08G 81/028* (2013.01); *C08L 51/06* (2013.01); *B32B 2597/00* (2013.01); *B82Y 30/00* (2013.01)

(58) Field of Classification Search
CPC .................................. C08L 51/06; C08K 3/34
See application file for complete search history.

(56) References Cited

U.S. PATENT DOCUMENTS

| | | |
|---|---|---|
| 3,963,799 A | 6/1976 | Starkweather, Jr. |
| 3,976,720 A | 8/1976 | Hammer et al. |
| 5,164,440 A | 11/1992 | Deguchi et al. |
| 5,342,886 A | 8/1994 | Glotin et al. |
| 6,350,804 B2 | 2/2002 | Adedeji et al. |
| 6,777,479 B1 | 8/2004 | Bernard et al. |
| 7,279,521 B2 | 10/2007 | Acquarulo, Jr. et al. |
| 2003/0229184 A1 | 12/2003 | Acquarulo, Jr. et al. |
| 2009/0209687 A1 | 8/2009 | Quijada Abarca et al. |

FOREIGN PATENT DOCUMENTS

| | | |
|---|---|---|
| EP | 0 352 042 A1 | 1/1990 |
| EP | 2 115 040 A | 11/2009 |
| EP | 2 196 489 A1 | 6/2010 |
| FR | 2 291 225 A | 6/1976 |
| FR | 2 912 150 A1 | 8/2008 |
| FR | 2 918 150 A1 | 1/2009 |
| FR | 2 966 464 A1 | 4/2012 |
| WO | WO 01/10945 A1 | 2/2001 |
| WO | WO 02/28959 A1 | 4/2002 |
| WO | WO 2008/043750 A1 | 4/2008 |

OTHER PUBLICATIONS

International Search Report (PCT/ISA/210) mailed on Jul. 29, 2013, by the French Patent Office as the International Searching Authority for International Application No. PCT/FR2013/050980.
King et al., "Effects of Carbon Fillers on Rheology of Polypropylene-based Resins", Journal of Composite Materials, (2009), vol. 43, No. 25, pp. 3073-3089.
Lim et al., "Dispersion Quality and Rheological Property of Polymer/Clay Nanocomposites: Ultrasonification Effect", Journal of Industrial and Engineering Chemistry, (2003), vol. 9, No. 1, pp. 51-57.
Rodlert et al., "Rheological behavior of hyperbranched polymer/montmorillonite clay nanocomposites", The Society of Rheology, Sep./Oct. (2004), vol. 48, No. 5, pp. 1049-1065.

*Primary Examiner* — Wenwen Cai
(74) *Attorney, Agent, or Firm* — Buchanan Ingersoll & Rooney P.C.

(57) ABSTRACT

A polyolefin graft polyamide composition incorporating lamellar nanofillers. Also, a tube, pipe or analogous formed from a multilayer at least one of the layers of which contains this composition. A thermoplastic composition having a polyolefin backbone containing a residue of at least one unsaturated monomer and a plurality of polyamide grafts, and also another component, wherein: the polyamide grafts are attached to the polyolefin backbone by the residue of the unsaturated monomer comprising a function capable of reacting via a condensation reaction with a polyamide having at least one amine end group and/or at least one carboxylic acid end group, the residue of the unsaturated monomer is attached to the backbone by grafting or copolymerization, wherein the other component consists of platy nanofillers, said nanofillers being phyllosilicates and representing from 1% to 6.5% by weight of the composition.

10 Claims, No Drawings

THERMOPLASTIC LAYER FOR A CABLE, PIPE, COATING OR ANALOGOUS

FIELD OF THE INVENTION

One subject of the invention is a thermoplastic composition for a multilayer part such as a cable, pipe, coating or the like (all types of structure having a layer, preferably at least two layers) comprising a polyamide-grafted polyolefin to which platy nanofillers are added.

An electrical cable conventionally has a multilayer structure in which the various thicknesses or layers have both specific functions and functions that are dependent on those of the other layers. Thus, such a cable generally comprises an electricity-conducting wire surrounded successively by a semiconductor layer, an insulating layer, an outer semiconductor layer, then a protective sheath; each of said layers having to have, besides particular insulating/conducting properties, very specific mechanical and thermomechanical qualities.

Other types of cables, especially used in motor vehicles, must themselves have perfect resistance to oils or excellent aging resistance in oils.

Generally, the physicochemical properties (heat resistance or resistance to specific environmental conditions, UV resistance, etc.) of a thermoplastic composition are conventionally satisfied by the addition of particular particles and adjuvants to the detriment of the strictly mechanical or thermomechanical qualities or qualities linked to the industrial processability of this composition (viscosity in particular).

PRIOR ART

Document WO 02/28959 by the Applicant is known, which describes a polyamide-block graft copolymer on a polyolefin backbone which is chosen from ethylene/maleic anhydride and ethylene/alkyl(meth)acrylate/maleic anhydride copolymers, forming a nanostructured co-continuous blend. This particular composition gives this copolymer exceptional thermomechanical properties that are maintained when this graft copolymer is dispersed in flexible polyolefins such as ethylene copolymers.

One particular composition of this copolymer has furthermore been proposed for forming a layer (without dilution) in "under engine hood" cables, having an excellent oil resistance. Such a composition is disclosed in document EP 2 115 040.

Moreover, the aforesaid copolymer, used (pure) without addition in polyolefin matrices capable of giving the mixture particular properties, has a great flexibility which allows it to be used as external cable coating. Indeed, the Applicant's copolymer is easily used industrially, in particular in multilayer structures due to a very satisfactory viscosity, irrespective of the temperature conditions.

Nevertheless, for certain applications, it is necessary to very significantly increase its mechanical and thermomechanical properties.

Also known is document FR 2966464 by the Applicant, but the latter neither discloses nor even suggests the invention as presented hereinbelow.

BRIEF DESCRIPTION OF THE INVENTION

It has been observed by the Applicant, after various experiments and manipulations, that, contrary to the teaching is well known to a person skilled in the art, the polyamide-grafted polyolefin composition, in particular disclosed in document WO 02/28959, has, when a small amount of platy nanofillers are added thereto:

a significant increase in its elastic modulus over a wide temperature range, an improvement in its impact strength and a reduction in its ductile-brittle transition temperature, without moreover detrimentally modifying, especially with respect to the industrialization thereof, the rheology of the composition.

Indeed, even though the improvement of some mechanical properties of certain thermoplastics had been demonstrated when clay components are added, especially by documents U.S. Pat. No. 5,164,440, U.S. Pat. No. 6,350,804 or U.S. Pat. No. 7,279,521, it is known to a person skilled in the art that the addition of fillers, in particular of clay type (platy nanofillers), has in particular a very negative impact on the viscosity of the product, which very seriously handicaps its industrial processability. Examples of such teaching are found in the articles entitled:

"*Effects of Carbon Fillers on Rheology of Polypropylene-based Resins*", Journal of Composite Materials, Julia A. King et al., 2009;

"*Dispersion quality and rheological property of polymer/clay nanocomposites: ultrasonification effect*", S. T. Lim et al., 2002;

"*Rheological behavior of hyperbranched polymer/montmorillonite clay nanocomposites*", Rodlert. M et al., 2004.

Thus, the present invention relates to a thermoplastic composition consisting of a polyolefin backbone containing a residue of at least one unsaturated monomer (X) and a plurality of polyamide grafts, and also another component, wherein:

the polyamide grafts are attached to the polyolefin backbone by the residue of the unsaturated monomer (X) comprising a function capable of reacting via a condensation reaction with a polyamide having at least one amine end group and/or at least one carboxylic acid end group, the residue of the unsaturated monomer (X) is attached to the backbone by grafting or copolymerization, characterized in that the other component consists of platy nanofillers, said nanofillers being phyllosilicates and representing from 1% to 6.5% by weight of the composition.

The expression "platy nanofillers" is understood to mean an assembly of "mille feuille" [thousand leaves] sheets. The dimensions of the individual sheets are of the order of one nanometer in thickness and from several tens of nanometers to a few micrometers in length. Within the context of the present invention, the "platy nanofillers" are phyllosilicates (platy silicates) and will advantageously consist of montmorillonite.

Other advantageous characteristics of the invention are specified below:

preferably, the platy nanofillers are present at between 2% and 5% by weight of the composition;

advantageously, the aforesaid graft polymer is nanostructured;

according to one advantageous feature of the invention, the number-average molar mass of the aforesaid polyamide grafts of the aforesaid graft polymer is within the range extending from 1000 to 5000 g/mol, preferably between 2000 and 3000 g/mol;

advantageously, for the aforesaid graft polymers, the number of monomers (X) attached to the polyolefin backbone is greater than or equal to 1.3 and/or less than or equal to 20;

preferably, the unsaturated monomer (X) is selected from an unsaturated carboxylic acid anhydride and an unsaturated epoxide;

according to one advantageous feature of the invention, the polyamide of the grafts is an aliphatic homopolyamide, preferably selected from polyamide 6, polyamide 11 or polyamide 12;

according to one advantageous possibility offered by the invention, the aforesaid composition contains only the aforesaid polyamide-grafted polyolefin and the platy nanofillers.

The invention also relates to a multilayer part, such as a tube, pipe, cable, coating or the like, comprising a structure consisting of at least two adjacent layers, characterized in that one of said layers comprises a composition according to the invention as described above.

Such a multilayer part could for example consist of a pressure sheath used in offshore applications, in protectors for (electrical, optical, etc.) cables, in pipes irrespective of their function (transport of fluid such as gasoline, oil, refrigerants, etc.) or especially in tanks, for example motor vehicle (gasoline and other fluid) tanks. These parts may be obtained by various techniques, for example by extrusion or injection molding, without the composition according to the invention being limited to one particular technique.

The description which follows is given solely by way of illustration and nonlimitingly.

DETAILED DESCRIPTION OF THE INVENTION

Regarding this aforementioned graft polymer, the polyamide-block graft copolymer may be obtained by reaction of a polyamide, preferably a monofunctional polyamide, which has either a reactive end group that is an amine function, or a reactive end group that is a carboxylic acid function, with the residues of an unsaturated monomer X attached by grafting or copolymerization to a polyolefin backbone.

The unsaturated monomer (X) is preferably selected from an unsaturated carboxylic acid anhydride and an unsaturated epoxide.

In particular, in the case where the reactive end group of the polyamide graft is a carboxylic acid function, the unsaturated monomer (X) is an unsaturated epoxide.

In the case where the reactive end group of the polyamide graft is an amine function, the unsaturated monomer (X) may be either an unsaturated epoxide or an unsaturated carboxylic acid anhydride.

Regarding the polyolefin backbone, it is a polymer comprising an α-olefin as monomer.

α-Olefins having from 2 to 30 carbon atoms are preferred.

As α-olefin, mention may be made of ethylene, propylene, 1 butene, 1-pentene, 3-methyl-1-butene, 1-hexene, 4-methyl-1-pentene, 3-methyl-1-pentene, 1-octene, 1-decene, 1 dodecene, 1-tetradecene, 1-hexadecene, 1-octadecene, 1-eicosene, 1-docosene, 1-tetracosene, 1-hexacosene, 1-octacosene and 1-triacontene.

Mention may also be made of cycloolefins having from 3 to 30 carbon atoms, preferably from 3 to 20 carbon atoms, such as cyclopentane, cycloheptene, norbornene, 5-methyl-2-norbornene, tetracyclododecene and 2-methyl-1,4,5,8-dimethano-1,2,3,4,4a,5,8,8a-octahydronaphthalene; diolefins and polyolefins, such as butadiene, isoprene, 4-methyl-1,3-pentadiene, 1,4-pentadiene, 1,5-hexadiene, 1,3-hexadiene, 1,3-octadiene, 1,4-octadiene, 1,5-octadiene, 1,6-octadiene, ethylidene norbornene, vinyl norbornene, dicyclopentadiene, 7-methyl-1,6-octadiene, 4-ethylidene-8-methyl-1,7-nonadiene and 5,9-dimethyl-1,4,8-decatriene; vinylaromatic compounds such as monoalkylstyrenes or polyalkylstyrenes (including styrene, o-methylstyrene, m-methylstyrene, p-methylstyrene, o,p-dimethylstyrene, o-ethylstyrene, m-ethylstyrene and p-ethylstyrene), and derivatives comprising functional groups such as methoxystyrene, ethoxystyrene, vinylbenzoic acid, vinylmethyl benzoate, vinylbenzyl acetate, hydroxystyrene, o-chlorostyrene, p-chlorostyrene, divinylbenzene, 3-phenylpropene, 4-phenylpropene, α-methylstyrene, vinyl chloride, 1,2-difluoroethylene, 1,2-dichloroethylene, tetrafluoroethylene and 3,3,3-trifluoro-1-propene.

Within the context of the present invention, the term "α-olefin" also comprises styrene. Propylene, and very especially ethylene, are preferred as α-olefin.

This polyolefin may be a homopolymer when a single α-olefin is polymerized in the polymer chain. Mention may be made, as examples, of polyethylene (PE) or polypropylene (PP).

This polyolefin may also be a copolymer when at least two comonomers are copolymerized in the polymer chain, one of the two comonomers referred to as the "first comonomer" being an α-olefin and the other comonomer, referred to as the "second comonomer", is a monomer capable of polymerizing with the first monomer.

As the second comonomer, mention may be made of:

one of the α-olefins already mentioned, the latter being different from the first α-olefin comonomer, dienes, such as for example 1,4-hexadiene, ethylidene norbornene and butadiene, unsaturated carboxylic acid esters such as, for example, alkyl acrylates or alkyl methacrylates grouped together under the term alkyl(meth)acrylates. The alkyl chains of these (meth)acrylates may have up to 30 carbon atoms. Mention may be made, as alkyl chains, of methyl, ethyl, propyl, n-butyl, sec-butyl, isobutyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl. Methyl, ethyl and butyl(meth)acrylates are preferred as unsaturated carboxylic acid esters, carboxylic acid vinyl esters. As examples of carboxylic acid vinyl esters, mention may be made of vinyl acetate, vinyl versatate, vinyl propionate, vinyl butyrate or vinyl maleate. Vinyl acetate is preferred as carboxylic acid vinyl ester.

Advantageously, the polyolefin backbone comprises at least 50 mol % of the first comonomer; its density may advantageously be between 0.91 and 0.96.

The preferred polyolefin backbones consist of an ethylene/alkyl(meth)acrylate copolymer. By using this polyolefin backbone, excellent aging, light and temperature resistance are obtained.

It would not be outside of the scope of the invention if different "second comonomers" were copolymerized in the polyolefin backbone.

According to the present invention, the polyolefin backbone contains at least one residue of an unsaturated monomer (X) that can react at an acid and/or amine function of the polyamide graft via a condensation reaction. According to the definition of the invention, the unsaturated monomer (X) is not a "second comonomer".

As unsaturated monomer (X) included in the polyolefin backbone, mention may be made of:
- unsaturated epoxides. Among these they are, for example, aliphatic glycidyl esters and ethers such as allyl glycidyl ether, vinyl glycidyl ether, glycidyl maleate and glycidyl itaconate, glycidyl acrylate and glycidyl methacrylate. They are also, for example, alicyclic glycidyl esters and ethers such as 2-cyclohexene-1-glycidyl ether, glycidyl cyclohexene-4,5-dicarboxylate, glycidyl cyclohexene-4-carboxylate, glycidyl 5-norbornene-2-methyl-2-carboxylate and diglycidyl endo-cis-bicyclo[2.2.1]-5-heptene-2,3-dicarboxylate. As unsaturated epoxide, glycidyl methacrylate is preferably used.
- unsaturated carboxylic acids and their salts, for example acrylic acid or methacrylic acid and the salts of these same acids.
- carboxylic acid anhydrides. They may be chosen, for example, from maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides. As carboxylic acid anhydride, maleic anhydride is preferably used.

The unsaturated monomer (X) is preferably chosen from an unsaturated carboxylic acid anhydride and an unsaturated epoxide. In particular, for achieving the condensation of the polyamide graft with the polyolefin backbone, in the case where the reactive end group of the polyamide graft is a carboxylic acid function, the unsaturated monomer (X) is preferably an unsaturated epoxide. In the case where the reactive end group of the polyamide graft is an amine function, the unsaturated monomer (X) is advantageously an unsaturated epoxide and preferably an unsaturated carboxylic acid anhydride.

The polyolefin backbone containing the residue of the unsaturated monomer (X) is obtained by polymerization of the monomers (first comonomer, optional second comonomer, and optionally unsaturated monomer (X)). This polymerization can be carried out by a high-pressure radical process or a process in solution, in an autoclave or tubular reactor, these processes and reactors being well known to a person skilled in the art. When the unsaturated monomer (X) is not copolymerized in the polyolefin backbone, it is grafted to the polyolefin backbone. The grafting is also an operation that is known per se. The composition would be in accordance with the invention if several different functional monomers (X) were copolymerized with and/or grafted to the polyolefin backbone.

Depending on the types and ratio of monomers, the polyolefin backbone may be semicrystalline or amorphous. In the case of amorphous polyolefins, only the glass transition temperature is observed, whereas in the case of semicrystalline polyolefins a glass transition temperature and a melting temperature (which will inevitably be higher) are observed. A person skilled in the art will only have to select the ratios of monomer and the molecular masses of the polyolefin backbone in order to be able to easily obtain the desired values of the glass transition temperature, optionally of the melting temperature, and also of the viscosity of the polyolefin backbone.

The polyamide grafts may be either homopolyamides or copolyamides.

The expression "polyamide grafts" especially targets the aliphatic homopolyamides which result from the polycondensation:
- of a lactam;
- or of an aliphatic α,ω-aminocarboxylic acid;
- or of an aliphatic diamine and an aliphatic diacid.

As examples of a lactam, mention may be made of caprolactam, oenantholactam and lauryllactam.

As examples of an aliphatic α,ω-aminocarboxylic acid, mention may be made of aminocaproic acid, 7-aminoheptanoic acid, 11-aminoundecanoic acid and 12-aminododecanoic acid.

As examples of an aliphatic diamine, mention may be made of hexamethylenediamine, dodecamethylenediamine and trimethylhexamethylenediamine.

As examples of an aliphatic diacid, mention may be made of adipic, azelaic, suberic, sebacic and dodecanedicarboxylic acids.

Among the aliphatic homopolyamides, mention may be made, by way of example and nonlimitingly, of the following polyamides: polycaprolactam (PA-6); polyundecanamide (PA-11, sold by Arkema under the brand Rilsan®); polylauryllactam (PA-12, also sold by Arkema under the brand Rilsan®); polybutylene adipamide (PA-4,6); polyhexamethylene adipamide (PA-6,6); polyhexamethylene azelamide (PA-6,9); polyhexamethylene sebacamide (PA-6,10); polyhexamethylene dodecanamide (PA-6,12); polydecamethylene dodecanamide (PA-10,12); polydecamethylene sebacamide (PA-10,10) and polydodecamethylene dodecanamide (PA-12,12).

The expression "semicrystalline polyamides" also targets cycloaliphatic homopolyamides.

Mention may especially be made of the cycloaliphatic homopolyamides which result from the condensation of a cycloaliphatic diamine and an aliphatic diacid.

As an example of a cycloaliphatic diamine, mention may be made of 4,4'-methylenebis(cyclohexylamine), also known as para-bis(aminocyclohexyl)methane or PACM, 2,2'-dimethyl-4,4'-methylenebis(cyclohexylamine), also known as bis(3-methyl-4-aminocyclohexyl)methane or BMACM.

Thus, among the cycloaliphatic homopolyamides, mention may be made of the polyamides PACM,12 resulting from the condensation of PACM with the C12 diacid, BMACM,10 and BMACM,12 resulting from the condensation of BMACM with, respectively, C10 and C12 aliphatic diacids.

The expression "polyamide grafts" also targets the semiaromatic homopolyamides that result from the condensation:
- of an aliphatic diamine and an aromatic diacid, such as terephthalic acid (T) and isophthalic acid (I). The polyamides obtained are then commonly known as "polyphthalamides" or PPAs; and
- of an aromatic diamine, such as xylylenediamine, and more particularly meta-xylylenediamine (MXD) and an aliphatic diacid.

Thus, nonlimitingly, mention may be made of the polyamides 6,T,6,I, MXD,6 or else MXD,10.

The polyamide grafts used in the composition according to the invention are preferably aliphatic homopolyamides, whether the polyamide is semicrystalline or amorphous.

By way of example, mention may be made of poly(caprolactam) PA-6, poly(hexamethylene adipamide) PA-6,6, poly(hexamethylene sebacamide) PA-6,10, poly(lauroamide) PA-12, poly(undecanamide) PA-11, poly(tetramethylene adipamide) PA-4,6, poly(hexamethylene azelamide) PA-6,9 or poly(hexamethylene dodecane-diamide) PA-6,12.

The degree of polymerization may vary to a large extent; depending on its value it is a polyamide or a polyamide oligomer.

Advantageously, the polyamide grafts are monofunctional.

So that the polyamide graft has a monoamine end group, it is sufficient to use a chain stopper of formula:

in which:
R₁ is hydrogen or a linear or branched alkyl group containing up to 20 carbon atoms,
R₂ is a group having up to 20 carbon atoms that is a linear or branched alkyl or alkenyl group, a saturated or unsaturated cycloaliphatic radical, an aromatic radical or a combination of the above. The stopper may be, for example, laurylamine or oleylamine.

So that the polyamide graft has a carboxylic monoacid end group, it is sufficient to use a chain limiter of formula R'1-COOH, R'1-CO—O—CO—R'2 or a carboxylic diacid.

R'1 and R'2 are linear or branched alkyl groups containing up to 20 carbon atoms.

Advantageously, the polyamide graft has one end group having an amine functionality. The preferred monofunctional polymerization stoppers are laurylamine and oleylamine.

The polycondensation defined above is carried out according to commonly known processes, for example at a temperature generally between 200° C. and 300° C., under vacuum or in an inert atmosphere, with stirring of the reaction mixture. The average chain length of the graft is determined by the initial molar ratio between the polycondensable monomer or the lactam and the monofunctional polymerization stopper. For the calculation of the average chain length, one chain stopper molecule is usually counted per one graft chain.

A person skilled in the art will only have to select the types and ratio of monomers and also choose the molar masses of the polyamide grafts in order to be able to easily obtain the desired values of the glass transition temperature, optionally of the melting temperature and also of the viscosity of the polyamide graft.

The condensation reaction of the polyamide graft on the polyolefin backbone containing the residue of X is carried out by reaction of one amine or acid function of the polyamide graft with the residue of X. Advantageously, monoamine polyamide grafts are used and amide or imide bonds are created by reacting the amine function with the function of the residue of X.

This condensation is preferably carried out in the melt state. To manufacture the composition according to the invention, it is possible to use conventional kneading and/or extrusion techniques. The components of the composition are thus blended to form a compound which may optionally be granulated on exiting the die.

To obtain a nanostructured composition, it is thus possible to blend the polyamide graft and the backbone in an extruder, at a temperature generally between 200° C. and 300° C. The average residence time of the molten material in the extruder may be between 5 seconds and 5 minutes, and preferably between 20 seconds and 1 minute. The efficiency of this condensation reaction is evaluated by selective extraction of free polyamide grafts, that is to say those that have not reacted to form the polyamide graft polymer.

The preparation of polyamide grafts having an amine end group and also their addition to a polyolefin backbone containing the residue of (X) is described in U.S. Pat. No. 3,976,720, U.S. Pat. No. 3,963,799, U.S. Pat. No. 5,342,886 and FR 2291225. The polyamide graft polymer of the present invention advantageously has a nanostructured organization.

Plasticizers could be added to the composition in order to facilitate processing and improve the productivity of the process for manufacturing the composition and the structures.

Mention will be made, as examples, of paraffinic, aromatic or naphthalenic mineral oils which also make it possible to improve the adhesive strength of the composition according to the invention. Mention may also be made, as plasticizers, of phthalates, azelates, adipates, and tricresyl phosphate.

In the same way, adhesion promoters, although not necessary, may advantageously be added in order to improve the adhesive strength of the composition when this adhesive strength must be particularly high. The adhesion promoter is a non-polymeric ingredient; it may be organic, crystalline, mineral and more preferably semi-mineral semi-organic. Among the latter, mention may be made of organic titanates or silanes, such as for example monoalkyl titanates, trichlorosilanes and trialkoxysilanes, trialkoxysilanes. Provision may also be made for these adhesion promoters to be grafted directly onto the polyolefin by a technique well known to a person skilled in the art, for example reactive extrusion.

Since UV radiation is capable of resulting in a slight yellowing of the composition, UV stabilizers and UV absorbers (these compounds being referred to generally as anti-UV agents), such as benzotriazole, benzophenone and other hindered amines, may be added in order to ensure the transparency of the formulation during its service life. These compounds may be, for example, based on benzophenone or benzotriazole. They can be added in amounts of less than 10%, and preferably of from 0.1% to 5%, by weight of the total weight of the composition.

Antioxidants could also be added in order to limit yellowing during the manufacture of the thermoplastic part, such as phosphorus-containing compounds (phosphonites and/or phosphites) and hindered phenolics. These antioxidants can be added in amounts of less than 10%, and preferably of from 0.1% to 5%, by weight of the total weight of the composition.

Similarly, flame retardant agents may also be added to the thermoplastic composition. These agents may be halogenated or non-halogenated. Among the halogenated agents, mention may be made of brominated products. Use may also be made, as non-halogenated agents, of additives based on phosphorus such as ammonium phosphate, polyphosphate, phosphinate or pyrophosphate, melamine cyanurate, pentaerythritol, zeolites and also mixtures of these agents. The composition may comprise these agents in proportions ranging from 3% to 40% relative to the total weight of the composition. Coloring or whitening compounds may also be added.

Preparation of the Composition According to the Invention:

The technique of grafting polyamide grafts onto the polyolefin backbone in order to obtain the polyamide-grafted polyolefin according to the invention is well known to a person skilled in the art, and especially from the documents cited above FR 2912150, FR 2918150 or EP 2 196 489.

The compounding was carried out on a Coperion ZSK 30 self-cleaning intermeshing co-rotating twin-screw extruder having a diameter of 30 millimeters, a length of 30 times its diameter, with a flat profile at 260° C., a throughput of 20 kg/h (kilograms per hour) and a rotational speed of 300 rpm (revolutions per minute). The materials are introduced into the main feed.

It would not be outside the scope of the invention if crosslinking agents are added. As examples, mention may be made of isocyanates or organic peroxides. This crosslinking may also be carried out by known irradiation techniques. This crosslinking may be carried out by one of numerous methods known to a person skilled in the art, especially by the use of thermally-activated initiators, for example peroxides and azo compounds, photoinitiators such as benzophenone, by radiation techniques comprising light rays, UV rays, electron beams and X-rays, silanes bearing reactive functions such as an aminosilane, an epoxysilane, a vinylsilane such as for example vinyltriethoxysilane or vinyltrimethoxysilane, and moisture crosslinking. The manual entitled "Handbook of polymer foams and technology" above, pages 198 to 204, provides additional information to which a person skilled in the art may refer.

It will also be noted that the composition according to the invention may also be present in the form of a masterbatch, conventionally in powder form. This masterbatch comprises, besides the composition according to the invention and optional additives, one or more peroxides intended to enable the polymerization/crosslinking of one or more polymer(s).

Materials Used for Forming the Formulations Tested:

Apolhya®: The Apolhya family is a family of polymers sold by Arkema which combine the properties of polyamides with those of polyolefins thanks to co-continuous morphologies being obtained on the nanometer scale.

Montmorillonite: mineral composed of hydrated aluminum magnesium silicate, well known to a person skilled in the art and which may be supplied by a very large number of companies.

Obtaining the Formulations of the Compositions Tested:

For the impact tests, bars having dimensions of 80×10×4 mm³ were produced by injection molding on a Krauss Maffei injection press. The following process parameters were used, irrespective of the montmorillonite content:

Injection temperature: 230° C.
Mold temperature: 32° C.
Hold time: 20 seconds
Material hold pressure: 200 bar.
Cooling time: 10 seconds For the dynamic mechanical tests (DMA), 1 mm (millimeter) thick monolayer strips were produced by extrusion casting on a laboratory extrusion line. This was a Haake 1 counter-rotating twin-screw extruder equipped with a 3 cm (centimeter) wide sheet die having a 1 mm (millimeter) opening. The barrel components are heated with a flat profile at 210° C.; the rotational speed of the screws is 80 rpm (revolutions per minute).

Tests Carried Out on the Strips and Bars:

The various samples produced are tested with an Apolhya® having an identical degree of polyamide grafting for all the samples while varying the weight percentage of montmorillonite, denoted hereinbelow by the abbreviation MMT.

Within the context of the tests presented below, use is made of Apolhya® LB93 (sold by the Applicant) having a degree of polyamide grafting of the order of 30% to 40% but it is clearly understood that tests were carried out with different amounts of degree of polyamide grafting and that the results obtained, for one and the same Apolhya®, were similar.

The table presents the results of the tests measuring the MFI or Melt Flow Index (viscosity index at 230° C., 2.16 kg), the modulus of elasticity (E') and also the value of the ductile-brittle transition temperature ($T_{DB}$) of the sample in question, measured respectively in megapascals, at 23° C. and at 140° C. and in degrees Celsius. The MFI measurements were carried out according to the standard ISO 1133, on a Göttfert MI-3 melt indexer. The die used has a diameter of 2095 millimeters and a length of 8000 millimeters. The preheating was set to five minutes. The measurements were made on samples dried under vacuum at 80° C. overnight (12 hours).

The elastic modulus (E') was measured using a viscometer or dynamic mechanical analyser (DMA), model Q800, on the extruded strips. A temperature sweep from −100 to 220° C. at 2° C./min (degrees per minute) at a stressing frequency of 1 Hz was carried out. The measurements were made on samples dried under vacuum at 80° C. overnight (12 hours).

The impact tests were carried out according to the standard ISO 179 1 eA with a temperature sweep between −40 and 23° C. on the injection-moulded bars. The samples were conditioned beforehand for 3 weeks at 23° C., 50% RH (relative humidity).

| | % MMT | MFI (g/10 min) | E' at 23° C. (MPa) | E' at 140° C. (MPa) | $T_{DB}$ (° Celsius) |
|---|---|---|---|---|---|
| Sample no. 1 | 0 | 8.6 | 436 | 45 | [+5 to +10] |
| Sample no. 2 | 0.5 | 8.9 | 444 | 46 | [+5 to +10] |
| Sample no. 3 | 0.8 | 9 | 453 | 47 | [+4 to +9] |
| Sample no. 4 | 1.2 | 9.1 | 477 | 49 | [−5 to 0] |
| Sample no. 5 | 1.8 | 9 | 488 | 50 | [−5 to 0] |
| Sample no. 6 | 2.4 | 8.9 | 500 | 51 | [−5 to −7.5] |
| Sample no. 7 | 4.8 | 10 | 590 | 60 | [−5 to −7.5] |
| Sample no. 8 | 5.5 | 8.3 | 620 | 63 | [−5 to −7.5] |
| Sample no. 9 | 6 | 7.7 | 650 | 67 | [−5 to 0] |
| Sample no. 10 | 7.5 | 4.3 | 710 | 73 | [0 to +10] |
| Sample no. 11 | 8 | 3 | 728 | 75 | [0 to +10] |

These results show clearly, and contrary again to what could theoretically and empirically be expected, that the compositions comprising a small amount by weight of platy nanofillers, of phyllosilicate type, make it possible to significantly, or even very significantly, improve the mechanical and thermomechanical qualities of a polyamide-grafted polyolefin of a particular type without however degrading its viscosity properties, in other words its rheology.

It will be noted that in particular samples no. 6 and no. 7 have very advantageous performances.

The invention claimed is:

1. A thermoplastic composition consisting of a polyolefin and platy nanofillers, wherein the polyolefin backbone comprises a residue of at least one unsaturated monomer (X), and a plurality of polyamide grafts
   attached to the polyolefin backbone through the residue of at least one unsaturated monomer (X) by a condensation reaction between a functional group from the residue of at least one unsaturated monomer (X) and at least one amine end group and/or at least one carboxylic acid end group from the polyamide, and
   the platy nanofillers being phyllosilicates and representing from 1% to 6.5% by weight of the composition.

2. The composition as claimed in claim 1, wherein the platy nanofillers consist of montmorillonite.

3. The composition as claimed in claim 1, wherein the platy nanofillers are present between 2% and 5% by weight of the composition.

4. The composition as claimed in claim 1, wherein the number-average molar mass of the polyamide grafts is within the range from 1000 to 5000 g/mol.

5. The composition as claimed in claim 1, wherein the number of monomers (X) in the polyolefin backbone is greater than or equal to 1.3 and less than or equal to 20.

6. The composition as claimed in claim 1, wherein the unsaturated monomer (X) is selected from the group consisting of unsaturated carboxylic acid anhydrides and unsaturated epoxides.

7. The composition as claimed in claim 1, wherein the polyamide grafts is an aliphatic homopolyamide.

8. The composition as claimed in claim 1, wherein the number-average molar mass of the polyamide grafts is between 2000 and 3000 g/mol.

9. The composition as claimed in claim 1, wherein the polyamide grafts is an aliphatic homopolyamide selected from the group consisting of polyamide 6, polyamide 11 and polyamide 12.

10. A multilayer part comprising the composition as claimed in claim 1.

* * * * *